United States Patent
Xue et al.

(10) Patent No.: US 11,699,303 B2
(45) Date of Patent: Jul. 11, 2023

(54) SYSTEM AND METHOD OF ACQUIRING COORDINATES OF PUPIL CENTER POINT

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yachong Xue, Beijing (CN); Hao Zhang, Beijing (CN); Lili Chen, Beijing (CN); Jiankang Sun, Beijing (CN); Xinkai Li, Beijing (CN); Guixin Yan, Beijing (CN); Xiaolei Liu, Beijing (CN); Yaoyu Lv, Beijing (CN); Menglei Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 162 days.

(21) Appl. No.: 17/319,933

(22) Filed: May 13, 2021

(65) Prior Publication Data
US 2022/0129660 A1    Apr. 28, 2022

(30) Foreign Application Priority Data
Oct. 28, 2020 (CN) .......................... 202011176143.X

(51) Int. Cl.
*G06T 7/73* (2017.01)
*G06T 7/80* (2017.01)
(Continued)

(52) U.S. Cl.
CPC .............. *G06V 40/193* (2022.01); *G06T 7/80* (2017.01); *G06V 40/171* (2022.01); *G06V 40/19* (2022.01)

(58) Field of Classification Search
None
See application file for complete search history.

(56) References Cited

U.S. PATENT DOCUMENTS

| | | | |
|---|---|---|---|
| 7,869,628 B2 * | 1/2011 | Corcoran ............. | G06V 40/193 382/117 |
| 7,920,723 B2 * | 4/2011 | Nanu ........................ | G06T 7/90 382/128 |

(Continued)

OTHER PUBLICATIONS

Tian et al., "Imperfect Iris Information for Identity Recognition," 2nd International Congress on Image and Signal Processing, Oct. 17-19, 2009 (Year: 2009).*

*Primary Examiner* — Soo Shin
(74) *Attorney, Agent, or Firm* — Brooks Kushman P.C.

(57) ABSTRACT

A system and a method of calculating coordinates of a pupil center point are provided. The system for acquiring the coordinates of the pupil center point includes a first camera, a second camera, a storage and a processor. The first camera is configured to capture a first image including a face and output the first image to the processor, the second camera is configured to capture a second image including a pupil and output the second image to the processor, a resolution of the first camera is smaller than a resolution of the second camera, and the storage is configured to store processing data, and the processor is configured to: acquire the first image and the second image; extract a first eye region corresponding to an eye from the first image; convert the first eye region into the second image, to acquire a second eye region corresponding to the eye in the second image; and (Continued)

detect a pupil in the second eye region and acquire the coordinates of the pupil center point.

13 Claims, 3 Drawing Sheets

(51) Int. Cl.
  *G06V 40/16* (2022.01)
  *G06V 40/18* (2022.01)
  *G06V 40/19* (2022.01)

(56) References Cited

U.S. PATENT DOCUMENTS

| | | | | |
|---|---|---|---|---|
| 9,185,352 | B1* | 11/2015 | Jacques | H04N 7/18 |
| 11,474,359 | B2* | 10/2022 | Samec | G16H 40/67 |
| 2008/0049185 | A1* | 2/2008 | Huffman | A61B 3/113 |
| | | | | 351/206 |
| 2013/0329079 | A1* | 12/2013 | Florea | H04N 5/2621 |
| | | | | 348/222.1 |
| 2014/0300538 | A1* | 10/2014 | Rijnders | G06F 3/013 |
| | | | | 382/103 |
| 2015/0044649 | A1* | 2/2015 | Voss | G06V 40/176 |
| | | | | 434/236 |
| 2016/0004303 | A1* | 1/2016 | Arar | G06F 3/013 |
| | | | | 345/156 |
| 2016/0202757 | A1* | 7/2016 | Miao | G06F 3/013 |
| | | | | 348/78 |
| 2018/0173948 | A1* | 6/2018 | Gousev | G06F 1/3203 |
| 2018/0173986 | A1* | 6/2018 | Gousev | G06V 40/193 |

* cited by examiner

SYSTEM AND METHOD OF ACQUIRING COORDINATES OF PUPIL CENTER POINT

CROSS-REFERENCE TO RELATED APPLICATION

This application claims priority to Chinese Patent Application No. 202011176143.X filed on Oct. 28, 2020, which is incorporated herein by reference in its entirety.

TECHNICAL FIELD

The present disclosure relates to the field of pupil detection technology, in particular to a system and a method of acquiring coordinates of a pupil center point.

BACKGROUND

Usually, a method of calculating coordinates of a pupil center point includes the following steps: capturing a face image including a face by using a camera, performing face detection in the face image to acquire an eye region corresponding to an eye, and performing pupil detection in the eye region to acquire the coordinates of the pupil center point.

A calculation accuracy and calculation speed of the coordinates of the pupil center point are related to a resolution of the camera. The calculation speed may be reduced based on a face image captured by using a camera having a high resolution while the calculation accuracy may be reduced based on a face image captured by using a camera having a low resolution.

SUMMARY

A system of calculating coordinates of a pupil center point is provided, including a first camera, a second camera, a storage and a processor. The first camera is configured to capture a first image including a face and output the first image to the processor, the second camera is configured to capture a second image including a pupil and output the second image to the processor, a resolution of the first camera is smaller than a resolution of the second camera, and the storage is configured to store processing data, and the processor is configured to: acquire the first image and the second image; extract a first eye region corresponding to an eye from the first image; convert the first eye region into the second image, to acquire a second eye region corresponding to the eye in the second image; and detect a pupil in the second eye region and acquire the coordinates of the pupil center point.

Optionally, the processor is configured to: convert the second image in the second eye region into a grayscale image; calculate and acquire an image gradient matrix of the grayscale image; and calculate the coordinates of the pupil center point in accordance with the image gradient matrix.

Optionally, the processor is configured to: calculate an adaptive threshold corresponding to the image gradient matrix; perform a normalization on each gradient value in the image gradient matrix in accordance with the adaptive threshold, to acquire an updated image gradient matrix; and calculate the coordinates of the pupil center point in accordance with the updated image gradient matrix.

Optionally, the processor is configured to: calculate a mean value $M_{arg}$ and a standard deviation $M_{dev}$ of the image gradient matrix; calculate an average grayscale value $M_{gth}$ of a pupil region; and calculate the adaptive threshold $M_{threshold}$ by using the following formula:

$$M_{threshold} = M_{gth} * \frac{M_{dev}}{\sqrt{W_e * H_e}} + M_{arg}.$$

Optionally, the processor is configured to: select any point in the image gradient matrix as a target point; calculate a sum of vector dot products between the target point and remaining points in the image gradient matrix; select a next target point and calculate a sum of vector dot products between the next target point and remaining points in the image gradient matrix until all points in the image gradient matrix are selected, to acquire a plurality of sums of vector dot products; and compare all the sums of the vector dot products and take coordinates of the target point corresponding to a minimum sum of vector dot products as the coordinates of the pupil center.

Optionally, the processor is configured to: create a weight matrix; select any point in the image gradient matrix as a target point; calculate a sum of vector dot products between the target point and remaining points in the image gradient matrix in combination with the weight matrix; select a next target point and calculate a sum of vector dot products between the next target point and remaining points in the image gradient matrix until all points in the image gradient matrix are selected, to acquire a plurality of sums of vector dot products; and compare all the sums of the vector dot products and take coordinates of the target point corresponding to a maximum sum of vector dot products as the coordinates of the pupil center. The weight matrix is MAX-$P_{x,y}$, MAX is a maximum grayscale value corresponding to a color bit depth, and $P_{x,y}$ is a pixel value in the grayscale image.

Optionally, the processor is further configured to perform a camera calibration on the first camera and the second camera to acquire an inter-camera coordinate conversion parameter between the first camera and the second camera.

Optionally, the processor is further configured to: perform a face detection on the first image and acquire LandMark points; and compare the LandMark points with a standard face model to acquire a space coordinate conversion parameter.

Optionally, the processor is further configured to, after detecting the pupil and acquiring the coordinates of the pupil center point, convert the coordinates of the pupil center point into second coordinate values that are based on the first image in accordance with the inter-camera coordinate conversion parameter; and convert the second coordinate values into three-dimensional coordinate values in accordance with the space coordinate conversion parameter.

Optionally, the first camera is a color camera, the first image is a color image captured by using the first camera, the second camera is an infrared camera, the second image is an infrared image captured by using the second camera, and the system further includes an infrared light source that performs infrared supplementary lighting under the control of the processor.

A method of acquiring coordinates of a pupil center point is further provided, including: acquiring a first image including a face and a second image including a pupil; extracting a first eye region corresponding to an eye from the first image; converting the first eye region into the second image, to acquire a second eye region corresponding to the eye in the second image; and detecting a pupil in the second eye region and acquiring the coordinates of the pupil center point; where a resolution of the first image is smaller than a resolution of the second image.

Optionally, the detecting the pupil and acquiring the coordinates of the pupil center point includes: converting the second image in the second eye region into a grayscale image; calculating and acquiring an image gradient matrix of the grayscale image; calculating an adaptive threshold corresponding to the image gradient matrix; performing normalization on each gradient value in the image gradient matrix in accordance with the adaptive threshold, to acquire an updated image gradient matrix; and calculating the coordinates of the pupil center point in accordance with the updated image gradient matrix.

Optionally, the calculating the coordinates of the pupil center point in accordance with the updated image gradient matrix includes: creating a weight matrix; selecting any point in the image gradient matrix as a target point; calculating a sum of vector dot products between the target point and remaining points in the image gradient matrix in combination with the weight matrix; selecting a next target point and calculating a sum of vector dot products between the next target point and remaining points in the image gradient matrix until all points in the image gradient matrix are selected, to acquire a plurality of sums of vector dot products; and comparing all the sums of the vector dot products and taking coordinates of the target point corresponding to a maximum sum of vector dot products as the coordinates of the pupil center; where the weight matrix is MAX-$P_{x, y}$, MAX is a maximum grayscale value corresponding to a color bit depth, and $P_{x, y}$ is a pixel value in the grayscale image.

Optionally, subsequent to the detecting the pupil and acquiring the coordinates of the pupil center point, the method further includes: converting the coordinates of the pupil center point into second coordinate values based on the first image in accordance with an inter-camera coordinate conversion parameter; and converting the second coordinate values into three-dimensional coordinate values in accordance with a space coordinate conversion parameter. The inter-camera coordinate conversion parameter is acquired through performing camera calibration on the first camera and the second camera, and the space coordinate conversion parameter is acquired through: performing face detection on the first image and acquiring LandMark points; and comparing the LandMark points with a standard face model to acquire the space coordinate conversion parameter.

Optionally, the calculating the adaptive threshold corresponding to the image gradient matrix includes: calculating a mean value $M_{arg}$ and a standard deviation $M_{dev}$ of the image gradient matrix; calculating an average grayscale value $M_{gth}$ of a pupil region; and calculating the adaptive threshold $M_{threshold}$ by using the following formula:

$$M_{threshold} = M_{gth} * \frac{M_{dev}}{\sqrt{W_e * H_e}} + M_{arg}.$$

Optionally, the calculating the coordinates of the pupil center point in accordance with the updated image gradient matrix includes: selecting any point in the image gradient matrix as a target point; calculating a sum of vector dot products between the target point and remaining points in the image gradient matrix; selecting a next target point and calculating a sum of vector dot products between the next target point and remaining points in the image gradient matrix until all points in the image gradient matrix are selected, to acquire a plurality of sums of vector dot products; and comparing all the sums of the vector dot products and taking coordinates of the target point corresponding to a minimum sum of vector dot products as the coordinates of the pupil center.

BRIEF DESCRIPTION OF THE DRAWINGS

In order to illustrate the technical solutions of the embodiments of the present disclosure in a clearer manner, the drawings required for the description of the embodiments of the present disclosure will be described hereinafter briefly. Obviously, the following drawings merely relate to some embodiments of the present disclosure, and based on these drawings, a person of ordinary skill in the art may obtain other drawings without any creative effort.

DETAILED DESCRIPTION

Generally, a method of calculating coordinates of a pupil center point in the related art includes: capturing a face image including a face by using a camera, performing face detection in the face image to acquire an eye region corresponding to an eye, and performing pupil detection in the eye region to acquire the coordinates of the pupil center point.

The calculation accuracy and calculation speed of the coordinates of the pupil center point are related to a resolution of the camera. Although accurate coordinates of the pupil center point may be acquired based on a face image captured by using a camera having a high resolution, the calculation speed may be reduced. While the calculation speed may be improved based on a face image captured by using a camera having a low resolution, the calculation accuracy may be reduced.

In view of the above problems, a system for acquiring coordinates of a pupil center point is provided in the embodiments of the present disclosure. The system includes a first camera having a low resolution, a second camera having a high resolution and a processor. During a calculation process of the coordinates of the pupil center point performed by the processor, the first camera is configured to capture a face image, the second camera is configured to capture a pupil image, face detection is performed on a low-resolution image acquired by using the first camera, so as to acquire a first eye region corresponding to an eye. The first eye region is corresponded to a second image, so as to acquire a second eye region corresponding to the eye in the second image. Finally, pupil detection is performed in the second eye region by using a pupil detection algorithm, and the coordinates of the pupil center point are acquired.

In this way, the eye region may be detected rapidly based on the low-resolution image, and then pupil detection is performed on the high-resolution image to acquire a high-accuracy calculation result. Computational complexity of the entire calculation process is less, the calculation speed is fast, and the calculation result is relatively accurate, so as to acquire the coordinates of the pupil center point rapidly and accurately.

In order to make the objects, the technical solutions and the advantages of the present disclosure more apparent, the technical solutions in the embodiments of the present disclosure will be described hereinafter in a clear and complete manner with reference to the drawings. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
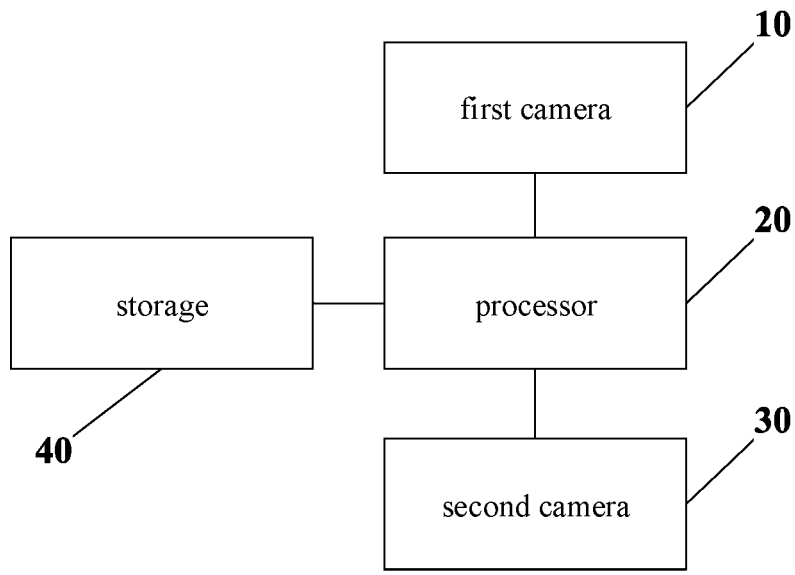
FIG. 1 is a schematic structural diagram of a system for acquiring coordinates of a pupil center point according to the embodiment of the present disclosure.

FIG. 1 is a schematic structural diagram of a system for acquiring coordinates of a pupil center point according to the embodiment of the present disclosure. As shown in FIG. 1, the system includes a first camera 10, a second camera 30, a storage 40 and a processor 20. The first camera 10 is configured to capture a first image including a face and output the first image to the processor 20, the second camera 30 is configured to capture a second image including a pupil and output the second image to the processor 20, and a resolution of the first camera 10 is smaller than a resolution of the second camera 30. The storage 40 is configured to store processing data, and the processor 20 is configured to perform a method of acquiring coordinates of a pupil center point in the following embodiments.

Optionally, the first camera 10 is an RGB camera, i.e., a color camera. The color camera captures a color image including a face, and a better detection effect may be achieved when performing face detection on the first image that is color. The second camera 30 is an infrared (IR) camera, and the infrared camera captures an infrared image including a pupil. Pupil characteristics are more apparent in the infrared image captured by the infrared camera than in the color image captured by the color camera, so as to facilitate the pupil detection. In addition, camera-shooting performed by the infrared camera is not limited by a use environment, and the infrared camera may be applied in a bright or dark environment.

In the embodiment in which the second camera 30 is the IR camera, an infrared light source for infrared supplementary lighting is further provided. Multiple infrared light sources may be set according to the luminous power and camera-shooting requirements. For example, the infrared light sources may be multiple infrared LED lights surrounding the first camera and the second camera.

In order to simplify a coordinate conversion between cameras, a focal length and a viewing angle of the first camera 10 is the same as those of the second camera 30.

Optionally, the system is a SmartView or naked eye 3D display product.

Figure 2:
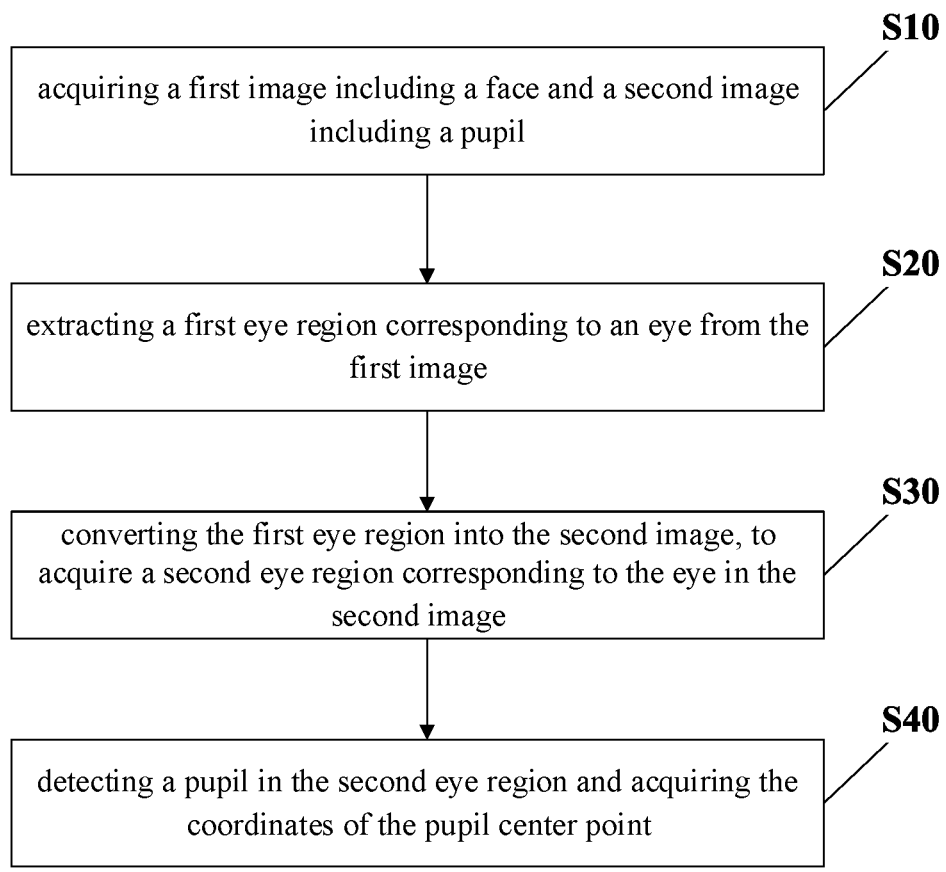
FIG. 2 is a flow chart illustrating a method of acquiring coordinates of a pupil center point according to the embodiment of the present disclosure.

The method of acquiring the coordinates of the pupil center point is further provided in the embodiments of the present disclosure, and may be applied to the system in the foregoing embodiment. As shown in FIG. 2, the method of acquiring the coordinates of the pupil center point includes the following steps.

Step S10, acquiring a first image including a face and a second image including a pupil.

The first image is an image including a face captured by using the first camera, and the second image is an image including a pupil captured by using the second camera. A resolution of the first camera is lower than that of the second camera, that is, a resolution of the first image is smaller than a resolution of the second image.

Optionally, the first camera is an RGB camera, i.e., a color camera. The color camera captures a color image including a face, and a better detection effect may be achieved when performing face detection on the first image that is color. The second camera is an infrared (IR) camera, and the infrared camera captures an infrared image including a pupil. Pupil characteristics are more apparent in the infrared image captured by the infrared camera than in the color image captured by the color camera, so as to facilitate the pupil detection. In addition, camera-shooting performed by the infrared camera is not limited by a use environment, and the infrared camera may be applied in a bright or dark environment. In the embodiment in which the second camera is the IR camera, an infrared light source for infrared supplementary lighting is further provided.

The embodiment of the present disclosure is described by taking that the first camera is the RGB camera and the second camera is the IR camera as an example, which is not limited thereto. For example, in another possible implementation, the first camera and the second camera may each be an RGB camera, and the resolution of the first camera is smaller than that of the second camera, and a method of acquiring coordinates of a pupil center point may refer to the description in the present disclosure.

Step S20, extracting a first eye region corresponding to an eye from the first image.

A face may be searched in an entire image range of the first image by using a face detection algorithm, and after a face box is acquired, LandMark point detection is performed so as to acquire LandMark points. The LandMark points are several mark points drawn on the face. Generally, the mark points are drawn at key positions such as edges, corners, contours, intersections and equal divisions. A shape of the face may be described by using the mark points.

For example, in a face identification model, the LandMark points includes 68 points. A corresponding relationship between the 68 points and different positions in the face is as follows: point 0 to point 16 correspond to a mandible line, point 17 to point 21 correspond to a right eyebrow, point 22 to point 26 correspond to a left eyebrow, point 27 to point 35 correspond to a nose, point 36 to point 41 correspond to a right eye, point 42 to point 47 correspond to a left eye, point 48 to point 60 correspond to an outer contour of a mouth, and point 61 to point 67 correspond to an inner contour of the mouth.

From the above description, it may be acquired that the LandMark points include feature points corresponding to a boundary of an eye, and a region, i.e., an eye region, is surrounded by the feature points corresponding to the boundary of the eye. In accordance with the feature points corresponding to the boundary of the eye in the LandMark points, the eye region may be extracted. Generally, the eye region includes coordinates of the upper left vertex of the eye region and a size of the eye region. An eye region in the first image may be defined as the first eye region.

Optionally, after the 68 LandMark points are acquired in the face, Kalman filtering may be performed on each LandMark point according to practical applications, so as to reduce the hopping of the LandMark points and improve the stability of the LandMark points, thereby acquiring relatively stable 68 LandMark points. And then the eye region may be extracted, so that the extraction result of the eye region is more accurate.

Step S30, converting the first eye region into the second image, to acquire a second eye region corresponding to the eye in the second image.

The resolution of the second camera is higher, and computational complexity is large when performing pupil detection on the second image directly. Moreover, in the embodiment where the second camera is the infrared camera, there are many interference issues in the second image captured by using the infrared camera. In the case that pupil detection is directly performed on the second image, a detection result of the pupil detection may be affected adversely by the interference factors. For example, misidentification of the pupil may occur, which may cause a large error in the calculation of the coordinates of the pupil center point. Therefore, after the first eye region is acquired in step S20, the first eye region may be converted into the second image, so as to acquire the second eye region corresponding to the eye in the second image. Further, the pupil is detected in the second eye region and the coordinates of the pupil center point are acquired.

In addition, because an internal parameter matrix and an external parameter matrix of the first camera are different from those of the second camera, after the first eye region is calculated in the first image, the first eye region cannot be directly applied to the second image. Coordinates of the first eye region relative to the first image needs to be converted to coordinates thereof in a coordinate system corresponding to the second image, so as to acquire the second eye region corresponding to the eye region in the coordinate system of the second image.

The coordinate conversion between the first image and the second image is realized through an inter-camera coordinate conversion parameter, and the inter-camera coordinate conversion parameter may be determined in accordance with internal parameter matrices and external parameter matrices of the first camera and the second camera. An internal parameter matrix includes a parameter that reflects a characteristic of a camera, which is generally related to a focal length and distortion of a camera lens. An external parameter matrix includes coordinates of the camera relative to a world coordinate system, which may be considered as a position of the camera in the world coordinate system, and include X, Y, Z coordinates of the camera and an angle of an optical axis of the camera relative to the world coordinate system.

Optionally, the first camera and the second camera are arranged adjacent to each other, field of view (FOV) of the two cameras is the same, and a coordinate conversion relationship between the first camera and the second camera is:

$$X_{IR} = \frac{X_{RGB} * W2}{W1}, Y_{IR} = \frac{Y_{RGB} * W2}{W1}$$

where the resolution of the first camera is W1*H1, and the resolution of the second camera is W2*H2.

The coordinate conversion between cameras may be simplified by using two cameras having the same FOV Step S40, detecting a pupil in the second eye region and acquiring the coordinates of the pupil center point.

Pupil information may be extracted from the second eye region corresponding to the eye region in the second image by using a pupil detection algorithm, so as to calculate and acquire the coordinates of the pupil center point.

In the method of acquiring the coordinates of the pupil center point of the embodiments, face identification is performed in the first image having a low resolution, and the first eye region is acquired. Next, the first eye region is mapped into the second image through a coordinate conversion, so as to acquire the second eye region corresponding to the eye in the second image. Finally, pupil detection is performed, and the coordinates of the pupil center point are calculated in the second eye region. Because the second image has a high resolution, the calculation result of the coordinates of the pupil center point is more accurate, as compared with performing face identification and extracting the eye region in the second image directly, computational complexity is less and the calculation speed is fast when performing face identification and extracting the eye region in the first image having a low resolution. That is, in the method of acquiring the coordinates of the pupil center point of the embodiments of the present disclosure, it is able to improve the calculation speed while improving the calculation accuracy. Thus, the method may be applied to a scenario having a high requirement on the calculation accuracy and real-time when calculating the coordinates of the pupil center point.

Optionally, the internal parameter matrices of the first camera and the second camera may be acquired by using Zhang's calibration method. The acquisition process includes the following steps. A calibration target is placed in front of the first camera and the second camera within a set distance range, so as to ensure that each camera may capture a clear image of the calibration target. Next, the calibration target is rotated or twisted. After each rotation or twist, each camera may capture an image used as an image of the calibration target. Multiple images of the calibration target may be acquired by each camera after performing camera-shooting for several times at different angles. Finally, respective internal parameter matrices may be calculated for the cameras through a program in accordance with respective multiple images of the calibration target.

The above camera calibration process only needs to be performed once, and there is no need to repeat it after acquiring the internal parameter matrix of the camera.

Optionally, the method of acquiring the coordinates of the pupil center point further includes performing face detection on the first image and acquiring LandMark points and comparing the LandMark points with a standard face model to acquire the space coordinate conversion parameter.

The acquisition of the LandMark points may refer to the description in step S20, which is not repeated herein.

As stated in step S20, the 68 LandMark points may be acquired by performing face identification on the first image. Perspective-n-Point (PnP) operation may be performed between the 68 LandMark points and coordinates of 68 LandMark points in the standard face model, and a translation matrix T and a rotation matrix R from a coordinate system of the first image to a three-dimensional space coordinate system may be acquired. The space coordinate conversion parameters include the translation matrix T and the rotation matrix R. Through the PnP operation, a distance from a face to the first camera may be further acquired.

Figure 3:
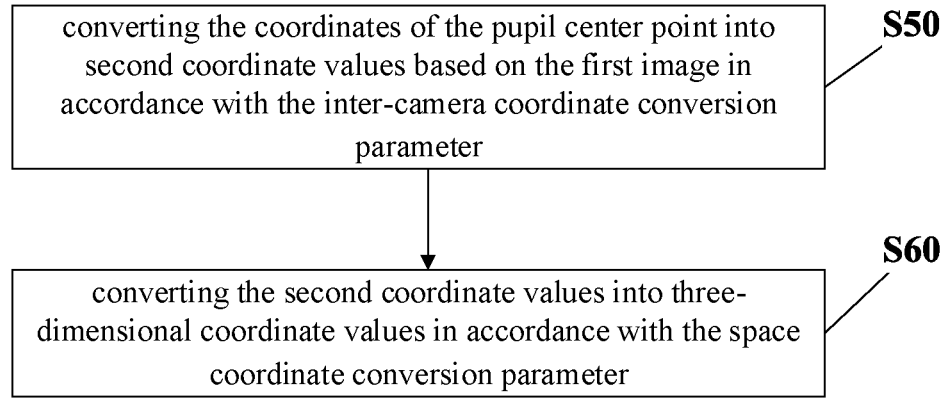
FIG. 3 is another flow chart illustrating the method of acquiring the coordinates of the pupil center point according to the embodiment of the present disclosure.
Figure 4:
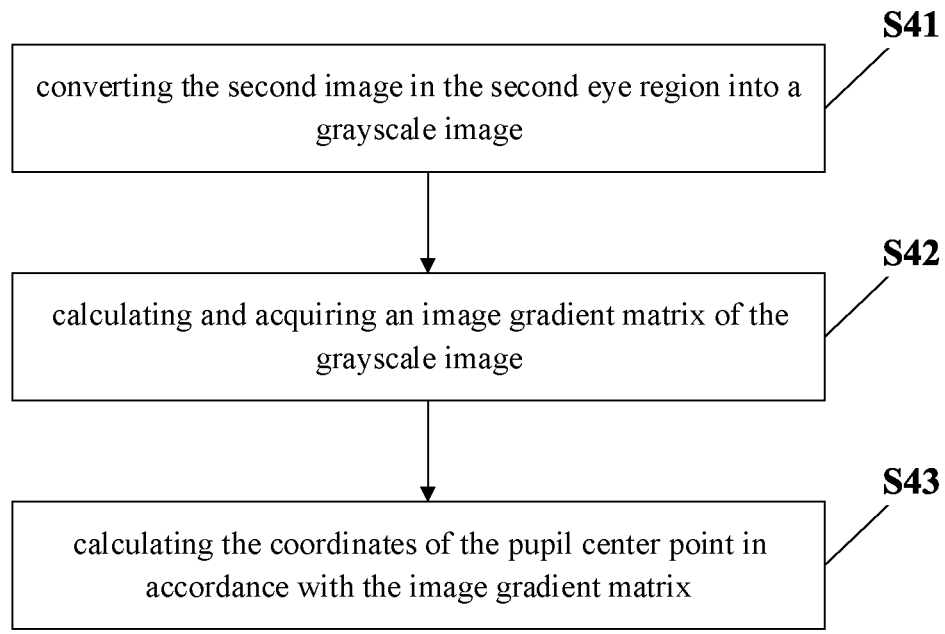
FIG. 4 is still another flow chart illustrating the method of acquiring the coordinates of the pupil center point according to the embodiment of the present disclosure.

After acquiring the inter-camera coordinate conversion parameter and the space coordinate conversion parameter, the coordinates of the pupil center point acquired in step S40 may be converted into three-dimensional space coordinates according to design requirements. As shown in FIG. 3, the method of acquiring the coordinates of the pupil center point further includes the following steps that are subsequent to step S40.

Step S50, converting the coordinates of the pupil center point into second coordinate values based on the first image in accordance with the inter-camera coordinate conversion parameter.

The coordinates of the pupil center point acquired in step S40 are based on the second image, i.e., based on a coordinate system of the second camera. According to the description in step S30, the coordinate conversion between the first camera and the second camera may be realized through the inter-camera coordinate conversion parameter. Therefore, the coordinates of the pupil center point acquired in step S40 may be converted by using the inter-camera coordinate conversion parameter, and then the second coordinate values corresponding to the coordinates of the pupil center point in the first image may be acquired. The second coordinate values are based on the first image, i.e., based on a coordinate system of the first camera.

For example, in an embodiment where the first camera and the second camera having the same focal length f, a conversion relationship between the coordinates of the pupil center point and the second coordinate values is $$\frac{l_x * (u_{C1} - u_{C2})}{l_x} = \frac{Z_{C1} - f}{Z_{C1}} = \frac{l_y * (v_{C1} - v_{C2})}{l_y}$$

where $(u_{c2}, v_{c2})$ represents the coordinates of the pupil center point acquired in step S40, $l_x$ represents a horizontal distance between a center point of a lens of the first camera and a center point of a lens of the second camera, $l_y$ represents a vertical distance between the center point of the lens of the first camera and the center point of the lens of the second camera, and f represents the focal length of two cameras.

Step S60, converting the second coordinate values into three-dimensional coordinate values in accordance with the space coordinate conversion parameter.

A conversion formula between the three-dimensional coordinate values in the world coordinate system and the second coordinate values is as follows $$Z_{C1} \begin{bmatrix} u_{C1} \\ v_{C1} \\ 1 \end{bmatrix} = \begin{bmatrix} f_{x1} & 0 & u_1 & 0 \\ 0 & f_{y1} & v_1 & 0 \\ 0 & 0 & 1 & 0 \end{bmatrix} \begin{bmatrix} R_1 & T_1 \\ \vec{0} & 1 \end{bmatrix} \begin{bmatrix} x_w \\ y_w \\ z_w \\ 1 \end{bmatrix} \quad (1)$$

where $$\begin{bmatrix} u_{C1} \\ v_{C1} \\ 1 \end{bmatrix}$$

represents the coordinates of the pupil center point that is based on the coordinate system of the first camera, i.e., the second coordinate values acquired in step S50, $Z_{C1}$ represents a distance from the face to the RGB camera, which may be acquired by performing the PnP operation on the LandMark points, $$\begin{bmatrix} f_{x1} & 0 & u_1 & 0 \\ 0 & f_{y1} & v_1 & 0 \\ 0 & 0 & 1 & 0 \end{bmatrix}$$

represents the internal parameter matrix of the first camera, which has been acquired through a camera calibration step, $$\begin{bmatrix} R_1 & T_1 \\ \vec{0} & 1 \end{bmatrix}$$

represents the translation matrix T and the rotation matrix R, i.e., the space coordinate conversion parameters, which have been acquired through the PnP operation on the LandMark points, and $$\begin{bmatrix} x_w \\ y_w \\ z_w \\ 1 \end{bmatrix}$$

represents the three-dimensional coordinate values of the pupil center point in the world coordinate system.

In this step, the three-dimensional coordinate values of the pupil center point in the world coordinate system may be acquired when substituting the known data into formula (1).

In the related art, there are few methods of calculating three-dimensional coordinate values of a pupil in the three-dimensional space. Usually, a model estimation is used. For example, after an eye region is acquired by using face detection, assuming that the pupil is located at the center position of an eye, the three-dimensional coordinate values of the pupil in the three-dimensional space are calculated. Or, after the eye region is acquired by using face detection, a relative difference value between an eye center and a face center in a standard face model is directly added to coordinates of a face, so as to acquire the three-dimensional coordinate values of the pupil in the three-dimensional space. However, it is unable to acquire accurate three-dimensional coordinate values in neither of the above two methods, and neither of the above two methods can be applied to a scenario having a high requirement on the calculation accuracy when calculating the coordinates of the pupil center point.

In the method of acquiring the coordinates of the pupil center point of the embodiments of the present disclosure, the three-dimensional coordinate values of the pupil center point in the three-dimensional space may be acquired rapidly and accurately through steps S10 to S60. Further, the method of acquiring the coordinates of the pupil center point has great application value in the SmartView or naked eye 3D display product.

Optionally, step S40 in the method of acquiring the coordinates of the pupil center point includes the following steps.

Step S41, converting the second image in the second eye region into a grayscale image.

Usually, such processing as Gaussian filtering is further included in this step. A pixel value of each pixel is a grayscale value after converting into the grayscale image.

Step S42, calculating and acquiring an image gradient matrix of the grayscale image.

Each gradient value in the image gradient matrix is $$M_g = \sqrt{X_g^2 + Y_g^2}$$

$X_g$ is a gradient in an X direction, and is acquired through the following formula:

$$X_g = \frac{P_{m+1,n} - P_{m-1,n}}{2}, (m = 1, 2, 3, \ldots, m-1).$$

$Y_g$ is a gradient in an Y direction, and is acquired through the following formula:

$$Y_g = \frac{P_{m,n+1} - P_{m,n+1}}{2}, (n = 1, 2, 3, \ldots, n-1)$$

where $P_{x,y}$ is a pixel value of a pixel (x, y).

Step S43, calculating the coordinates of the pupil center point in accordance with the image gradient matrix.

In accordance with gray characteristics and gradient characteristics of the pupil, the coordinates of the pupil center point may be calculated after the image gradient matrix is acquired.

Therefore, in the method of acquiring the coordinates of the pupil center point which is based on a gradient vector field, the coordinates of the pupil center point may be calculated in accordance with the grayscale characteristics and the gradient characteristics of the pupil, and may be further calculated on the color image or the infrared image, so as to solve the problem that it is difficult to calculate the coordinates of the pupil center point when in a complex environment, in an environment where the distance from the face to the camera is large or in a dark environment.

Figure 5:
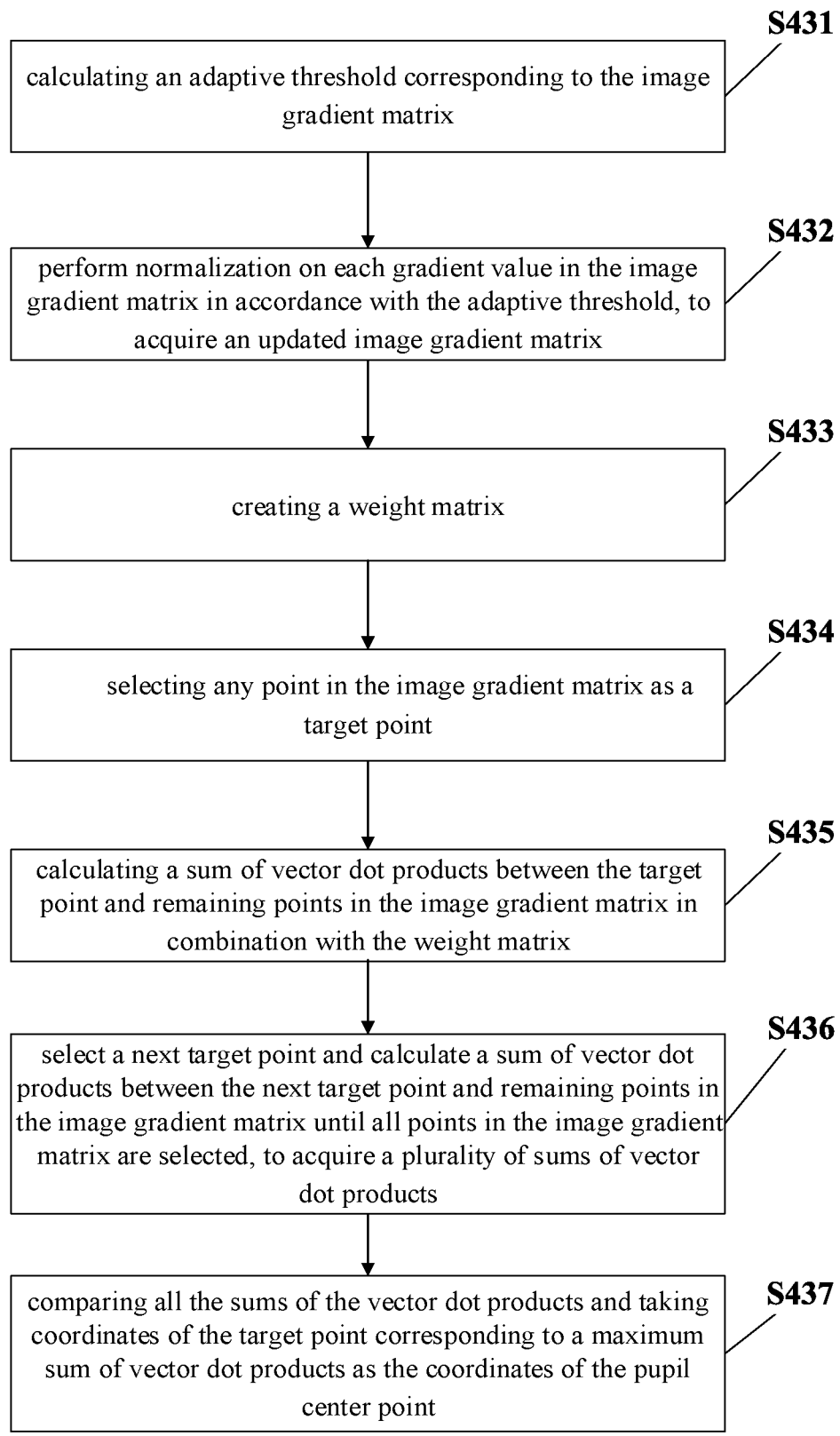
FIG. 5 is yet still another flow chart illustrating the method of acquiring the coordinates of the pupil center point according to the embodiment of the present disclosure.

In order to improve the accuracy of the calculation result of the coordinates of the pupil center point, in the embodiment of the present disclosure, calculation may be performed on the second eye region by using an adaptive threshold, so as to acquire the coordinates of the pupil center point. As shown in FIG. 5, step S43 includes the following steps.

Step S431, calculating an adaptive threshold corresponding to the image gradient matrix.

The adaptive threshold may be acquired as follows.

A mean value $M_{arg}$ and a standard deviation $M_{dev}$ of the image gradient matrix are calculated.

The mean value $M_{arg}$ may be calculated and acquired through the following formula $$M_{\arg} = \frac{1}{W_e * H_e} \sum_{i=0}^{i=m} \sum_{j=0}^{j=n} P_{m,n}$$

where We and He represent a width and a height of a monocular region in the second eye region respectively.

The standard deviation $M_{dev}$ may be calculated and acquired through the following formula $$M_{dev} = \sqrt{\frac{1}{W_e * H_e} \sum_{i=0}^{i=m} \sum_{j=0}^{j=m} (P_{i,j} - M_{\arg})}.$$

The adaptive threshold $M_{threshold}$ may be calculated and acquired through the following formula $$M_{threshold} = M_{gth} * \frac{M_{dev}}{\sqrt{W_e * H_e}} + M_{\arg}$$

where, $M_{gth}$ represents an average grayscale value of a pupil region. Generally, a diameter of a pupil does not exceed ⅛ of the eye region in a horizontal direction and does not exceed ¼ of the eye region in a longitudinal direction. Therefore, in the embodiment of the present disclosure, the eye region is equally divided into 32*16 rectangular grids, an average grayscale value of each rectangular grid is calculated, and a minimum average grayscale value is taken as $M_{gth}$.

Step S432, perform normalization on each gradient value in the image gradient matrix in accordance with the adaptive threshold, to acquire an updated image gradient matrix.

During the normalization process, each gradient value $M_g$ in the image gradient matrix is compared with the adaptive threshold $M_{threshold}$ acquired in step S431. In the case that $M_g > M_{threshold}$, $X_{g_{new}} = X_g/M_g$, and $Y_{g_{new}} = Y_g/M_g$. In the case that $M_g < M_{threshold}$, $X_{g_{new}} = 0$, and $Y_{g_{new}} = 0$. The updated gradient matrix in X-direction $X_{g_{new}}$ and the updated image gradient matrix in Y-direction $Y_{g_{new}}$, i.e., the updated image gradient matrix, is acquired after performing normalization on each gradient value $M_g$ in the image gradient matrix.

Step S433, creating a weight matrix.

Since grayscale values in the pupil region are small, and grayscale values in other regions are large, which is adverse to the pupil identification and calculation. Thus, in the method of acquiring the coordinates of the pupil center point of the embodiment of the present disclosure, the weight matrix W, which is MAX-$P_{x, y}$, is created, where MAX is a maximum grayscale value corresponding to a color bit depth. For example, when the image is of an 8 bit color bit depth, MAX is 255. $P_{x, y}$ is a pixel value in the grayscale image. It should be appreciated that, in the grayscale image, the pixel value is the grayscale value.

By creating the weight matrix W, it is able to increase the weight of the pupil region, and reduce the weight of other regions, which is beneficial to the pupil detection and the calculation of the coordinates of the pupil center, thereby to reduce the difficulty in the calculation.

Step S434, selecting any point in the image gradient matrix as a target point.

Step S435, calculating a sum of vector dot products between the target point and remaining points in the image gradient matrix in combination with the weight matrix.

Step S436, select a next target point and calculate a sum of vector dot products between the next target point and remaining points in the image gradient matrix until all points in the image gradient matrix are selected, to acquire a plurality of sums of vector dot products.

Step S437, comparing all the sums of the vector dot products and taking coordinates of the target point corresponding to a maximum sum of vector dot products as the coordinates of the pupil center point.

In the steps S434 to S437, the coordinates of the pupil center point may be calculated in accordance with the weight matrix W and the updated image gradient matrix.

In the updated image gradient matrix, a point O (x, y) is selected as a target point, and a point C (Xc, Yc) among the remaining points is selected as a second point, then a normalized OC vector in X direction and the normalized OC vector in Y direction are $$\overrightarrow{d\_X_{g_{new}}} = \frac{Xc - x}{\sqrt{(Xc - x)^2 + (Yc - y)^2}}$$

-continued $$\overrightarrow{d\_Y_{g_{new}}} = \frac{Yc - y}{\sqrt{(Xc - x)^2 + (Yc - y)^2}} \text{ respectively.}$$

A gradient at point C in X direction and Y-direction are $X_{g_{new-c}}$ and $Y_{g_{new-c}}$ respectively.

For the gradient around the pupil, there is such a regular pattern that, assuming that the pupil is of a circular shape, when O is the pupil center point and C is a point at the boundary of the pupil, the vector OC has a same direction as the gradient at the point C, and a dot product value between the vector OC and the gradient at the point C, i.e., $\overrightarrow{d\_X_{g_{new}}} * X_{g_{new-c}} + \overrightarrow{d\_Y_{g_{new}}} * Y_{g_{new-c}}$, is a maximum value.

In accordance with the above characteristics of the gradient around the pupil, a next target point is selected and a sum of vector dot products between the next target point and remaining points in the image gradient matrix is calculated until all points in the image gradient matrix are selected, and a plurality of sums of vector dot products is acquired. All the sums of the vector dot products are compared and it is determined whether the target point is the coordinates of the pupil center point through determining whether the sum of the vector dot products corresponding to the target point is a maximum value.

The sum of the vector dot products $OC_{sum}$ may be calculated through the following formula $$OC_{sum} = \frac{1}{W1 * H1} * \sum_{i=1}^{i=H1}\sum_{j=1}^{j=W1} W(i,j) * \left(\overrightarrow{d_{X_{g_{new}}}} * X_{g_{new}}(i,j) + \overrightarrow{d_{Y_{g_{new}}}} * Y_{g_{new}}(i,j)\right)$$

A next target point O is selected and a sum of vector dot products between the next target point O and remaining points in the image gradient matrix is calculated until all points in the image gradient matrix are selected, and a plurality of sums of vector dot products $OC_{sum}$ is acquired. The plurality of sums of the vector dot products $OC_{sum}$ are compared and a maximum sum of vector dot products is determined. The target point O corresponding to the maximum sum of vector dot products is the pupil center point, and coordinates of the target point O are the coordinates of the pupil center point.

Usually, the sum of vector dot products corresponding to the target point O at which a gradient value is 0 may not be the maximum value, and thus a point at which a gradient value is not 0 is selected as the target point in step S434 in order to simplify the calculation process.

The method of acquiring the coordinates of the pupil center point is based on the gradient vector field having the adaptive threshold. In the method of acquiring the coordinates of the pupil center point, the coordinates of the pupil center point may be calculated in accordance with the grayscale characteristics and the gradient characteristics of the pupil, and may be further calculated on the color image or the infrared image, so as to solve the problem that it is difficult to calculate the coordinates of the pupil center point when in a complex environment, in an environment where the distance from the face to the camera is large or in a dark environment.

In the steps of the above embodiment, by setting the weight matrix, it is able to increase the weight of the pupil region, and reduce the weight of other regions, so as to enable the characteristics of the pupil to stand out, which is beneficial to the pupil detection and the calculation of the coordinates of the pupil center, thereby to reduce the difficulty in the calculation. However, the embodiments of the present disclosure are not limited thereto. For example, in a possible embodiment of the present disclosure, the method of acquiring the coordinates of the pupil center point includes: selecting any point at which a gradient value is not zero in the image gradient matrix as a target point; calculating a sum of vector dot products between the target point and remaining points in the image gradient matrix; selecting a next target point at which a gradient value is not zero and calculate a sum of vector dot products between the next target point and remaining points in the image gradient matrix until all points at which gradient values are not zero in the image gradient matrix are selected, to acquire a plurality of sums of vector dot products; and comparing all the sums of the vector dot products and taking coordinates of the target point corresponding to a minimum sum of vector dot products as the coordinates of the pupil center point.

In this embodiment, an operation principle and operation process may refer to the description of steps S431 to steps S437, which is not repeated herein.

It should be appreciated that the method in the embodiments of the present disclosure may be performed by one device, such as one computer or server. The embodiments of the present disclosure may be also applied in a distributed scenario, and may be implemented through multiple devices in cooperation with each other. In the case of the distributed scenario, one of the multiple devices may only perform one or more steps in the method of the embodiments of the present disclosure, and the multiple devices may cooperate with each other to finish the method.

In addition, specific embodiments of the present disclosure are described. Other embodiments are within the scope of the appended claims. In some cases, operations or steps described in the claims may be performed in a different order from that in the embodiments and desired results may still be achieved. Further, the processes shown in the drawings do not necessarily require the shown specific order or sequential order to achieve the desired result. In some embodiments, multitasking and parallel processing are also possible or may be advantageous.

In the system for acquiring the coordinates of the pupil center point of the embodiments of the present disclosure, when the method of acquiring the coordinates of the pupil center point is performed by the processor, the same beneficial technical effects may be achieved. Therefore, it is able to improve the calculation speed while improving the calculation accuracy. Further, the system may be applied to a scenario having a high requirement on the calculation accuracy and real-time when calculating the coordinates of the pupil center point.

In the embodiment of the present disclosure, the computer-readable medium includes permanent, non-permanent, removable and non-removable media, and may achieve information storage by using any method or technology. The information may be computer-readable instructions, data structures, program modules, or other data. The computer storage medium may be, but not limited to, a phase change random access memory (PRAM), a Static Random Access Memory (SRAM), a Dynamic Random Access Memory (DRAM), another type of random access memory (RAM), a Read-Only Memory (ROM), an Electrically Erasable Programmable Read-Only Memory (EEPROM), a flash memory or another memory technology, a Compact Disc Read-Only Memory (CD-ROM), a digital versatile disc (DVD) or another optical storage, a magnetic cassette tape, magnetic tape magnetic disk storage or another magnetic storage device, or any other non-transmission medium, and is configured to store the information accessed by a computing device.

In the foregoing embodiment, the computer instructions stored in the storage medium are configured to enable the computer to implement the method described in any one of the foregoing embodiments, and same beneficial effects as those in the corresponding method embodiments and system embodiments may be achieved, and which is not repeated herein.

It should be appreciated that, the above-described embodiments are only used to illustrate the technical solutions of the present disclosure, and not to be construed as limiting the present disclosure. Although the present disclosure has been described in detail with reference to the foregoing embodiments, it will be apparent to those skilled in the art that modifications to the technical solutions in the foregoing embodiments, and equivalents to part of or all of the technical features are possible. The modifications or equivalents does not cause corresponding technical solutions to depart from the scope of the embodiments of the present disclosure essentially.

What is claimed is:

1. A system of calculating coordinates of a pupil center point, comprising a first camera, a second camera, a storage and a processor, wherein the first camera is configured to capture a first image comprising a face and output the first image to the processor, the second camera is configured to capture a second image comprising a pupil and output the second image to the processor, a resolution of the first camera is smaller than a resolution of the second camera, the storage is configured to store processing data, and the processor is configured to:
acquire the first image and the second image;
extract a first eye region corresponding to an eye from the first image;
convert the first eye region into the second image, to acquire a second eye region corresponding to the eye in the second image; and
detect a pupil in the second eye region and acquire the coordinates of the pupil center point,
wherein the processor is configured to: convert the second image in the second eye region into a grayscale image; calculate and acquire an image gradient matrix of the grayscale image; and calculate the coordinates of the pupil center point in accordance with the image gradient matrix,
wherein the processor is configured to:
select any point in the image gradient matrix as a target point;
calculate a sum of vector dot products between the target point and remaining points in the image gradient matrix;
select a next target point and calculate a sum of vector dot products between the next target point and remaining points in the image gradient matrix until all points in the image gradient matrix are selected, to acquire a plurality of sums of vector dot products; and
compare all the sums of the vector dot products and take coordinates of the target point corresponding to a minimum sum of vector dot products as the coordinates of the pupil center point.

2. The system according to claim 1, wherein the processor is configured to:
calculate an adaptive threshold corresponding to the image gradient matrix;
perform a normalization on each gradient value in the image gradient matrix in accordance with the adaptive threshold, to acquire an updated image gradient matrix; and
calculate the coordinates of the pupil center point in accordance with the updated image gradient matrix.

3. The system according to claim 2, wherein the processor is configured to:
calculate a mean value $M_{arg}$ and a standard deviation $M_{dev}$ of the image gradient matrix;
calculate an average grayscale value $M_{gth}$ of a pupil region; and
calculate the adaptive threshold $M_{threshold}$ by using the following formula:

$$M_{threshold} = M_{gth} * \frac{M_{dev}}{\sqrt{W_e * H_e}} + M_{arg},$$

wherein $W_e * H_e$ is the resolution of the first camera or the second camera.

4. The system according to claim 1, wherein the processor is configured to:
create a weight matrix;
select any point in the image gradient matrix as a target point;
calculate a sum of vector dot products between the target point and remaining points in the image gradient matrix in combination with the weight matrix;
select a next target point and calculate a sum of vector dot products between the next target point and remaining points in the image gradient matrix until all points in the image gradient matrix are selected, to acquire a plurality of sums of vector dot products; and
compare all the sums of the vector dot products and take coordinates of the target point corresponding to a maximum sum of vector dot products as the coordinates of the pupil center point;
wherein the weight matrix is MAX-$P_{x,\ y}$, MAX is a maximum grayscale value corresponding to a color bit depth, and $P_{x,\ y}$ is a pixel value in the grayscale image.

5. The system according to claim 1, wherein the processor is further configured to perform a camera calibration on the first camera and the second camera, to acquire an inter-camera coordinate conversion parameter between the first camera and the second camera.

6. The system according to claim 5, wherein the processor is further configured to:
perform a face detection on the first image and acquire LandMark points; and
compare the LandMark points with a standard face model to acquire a space coordinate conversion parameter.

7. The system according to claim 6, wherein the processor is further configured to, after detecting the pupil and acquiring the coordinates of the pupil center point,
convert the coordinates of the pupil center point into second coordinate values that are based on the first image in accordance with the inter-camera coordinate conversion parameter; and
convert the second coordinate values into three-dimensional coordinate values in accordance with the space coordinate conversion parameter.

8. The system according to claim 5, wherein the first camera is a color camera, the first image is a color image captured by using the first camera, the second camera is an infrared camera, the second image is an infrared image captured by using the second camera, and the system further comprises an infrared light source that performs infrared supplementary lighting under the control of the processor.

9. A method of acquiring coordinates of a pupil center point, comprising:
acquiring a first image comprising a face and a second image comprising a pupil;
extracting a first eye region corresponding to an eye from the first image;
converting the first eye region into the second image, to acquire a second eye region corresponding to the eye in the second image; and
detecting a pupil in the second eye region and acquiring the coordinates of the pupil center; wherein a resolution of the first image is smaller than a resolution of the second image,
wherein the detecting the pupil and acquiring the coordinates of the pupil center point comprises:
converting the second image in the second eye region into a grayscale image;
calculating and acquiring an image gradient matrix of the grayscale image;
calculating an adaptive threshold corresponding to the image gradient matrix;
performing a normalization on each gradient value in the image gradient matrix in accordance with the adaptive threshold, to acquire an updated image gradient matrix; and
calculating the coordinates of the pupil center point in accordance with the updated image gradient matrix,
wherein the calculating the coordinates of the pupil center point in accordance with the updated image gradient matrix comprises:
creating a weight matrix;
selecting any point in the image gradient matrix as a target point calculating a sum of vector dot products between the target point and remaining points in the image gradient matrix in combination with the weight matrix;
selecting a next target point and calculating a sum of vector dot products between the next target point and remaining points in the image gradient matrix until all points in the image gradient matrix are selected, to acquire a plurality of sums of vector dot products; and
comparing all the sums of the vector dot products and taking coordinates of the target point corresponding to a maximum sum of vector dot products as the coordinates of the pupil center point;
wherein the weight matrix is MAX-$P_{x,\ y}$, MAX is a maximum grayscale value corresponding to a color bit depth, and $P_{x,\ y}$ is a pixel value in the grayscale image.

10. The method according to claim 9, wherein subsequent to the detecting the pupil and acquiring the coordinates of the pupil center point, the method further comprises:
converting the coordinates of the pupil center point into second coordinate values based on the first image in accordance with an inter-camera coordinate conversion parameter; and
converting the second coordinate values into three-dimensional coordinate values in accordance with a space coordinate conversion parameter;
wherein the inter-camera coordinate conversion parameter is acquired through performing camera calibration on the first camera and the second camera, and the space coordinate conversion parameter is acquired through:
performing a face detection on the first image and acquiring LandMark points; and
comparing the LandMark points with a standard face model to acquire the space coordinate conversion parameter.

11. The method according to claim 9, wherein the calculating the adaptive threshold corresponding to the image gradient matrix comprises:
calculating a mean value $M_{arg}$ and a standard deviation $M_{dev}$ of the image gradient matrix;
calculating an average grayscale value $M_{gth}$ of a pupil region and calculating the adaptive threshold $M_{threshold}$ by using the following formula:

$$M_{threshold} = M_{gth} * \frac{M_{dev}}{\sqrt{W_e * H_e}} + M_{arg},$$

wherein $W_e*H_e$ is the resolution of the first camera or the second camera.

12. The method according to claim 9, wherein the calculating the coordinates of the pupil center point in accordance with the updated image gradient matrix comprises:
selecting any point in the image gradient matrix as a target point;
calculating a sum of vector dot products between the target point and remaining points in the image gradient matrix;
selecting a next target point and calculating a sum of vector dot products between the next target point and remaining points in the image gradient matrix until all points in the image gradient matrix are selected, to acquire a plurality of sums of vector dot products; and
comparing all the sums of the vector dot products and taking coordinates of the target point corresponding to a minimum sum of vector dot products as the coordinates of the pupil center point.

13. A system of calculating coordinates of a pupil center point, comprising a first camera, a second camera, a storage and a processor, wherein the first camera is configured to capture a first image comprising a face and output the first image to the processor, the second camera is configured to capture a second image comprising a pupil and output the second image to the processor, a resolution of the first camera is smaller than a resolution of the second camera, the storage is configured to store processing data, and the processor is configured to:
acquire the first image and the second image;
extract a first eye region corresponding to an eye from the first image;
convert the first eye region into the second image, to acquire a second eye region corresponding to the eye in the second image; and
detect a pupil in the second eye region and acquire the coordinates of the pupil center point,
wherein the processor is configured to: convert the second image in the second eye region into a grayscale image; calculate and acquire an image gradient matrix of the grayscale image; and calculate the coordinates of the pupil center point in accordance with the image gradient matrix,
wherein the processor is configured to:
create a weight matrix;
select any point in the image gradient matrix as a target point;

calculate a sum of vector dot products between the target point and remaining points in the image gradient matrix in combination with the weight matrix;

select a next target point and calculate a sum of vector dot products between the next target point and remaining points in the image gradient matrix until all points in the image gradient matrix are selected, to acquire a plurality of sums of vector dot products; and compare all the sums of the vector dot products and take coordinates of the target point corresponding to a maximum sum of vector dot products as the coordinates of the pupil center point;

wherein the weight matrix is MAX-$P_{x, y}$, MAX is a maximum grayscale value corresponding to a color bit depth, and $P_{x, y}$ is a pixel value in the grayscale image.

* * * * *